United States Patent Office 3,417,125
Patented Dec. 17, 1968

3,417,125
PROCESS FOR PREPARING UNSATURATED NITRILES BY CATALYTIC AMMOXIDATION OF OLEFINS
Jamal S. Eden, Akron, Ohio, assignor to The B. F. Goodrich Company, New York, N.Y., a corporation of New York
No Drawing. Continuation-in-part of applications Ser. No. 483,797, Aug. 30, 1965, and Ser. No. 663,558, Aug. 28, 1967. This application Nov. 1, 1967, Ser. No. 679,648
17 Claims. (Cl. 260—465.3)

ABSTRACT OF THE DISCLOSURE

Unsaturated nitriles such as acrylonitrile and methacrylonitrile are prepared in excellent yields by the ammoxidation of propylene or isobutylene in the presence of a catalyst containing (I) molybdenum oxide, tellurium oxide and a Group IIA alkaline earth metal phosphate or (II) a Group IIA alkaline earth metal molybdate, tellurium oxide and phosphorus pentoxide.

CROSS REFERENCES TO RELATED APPLICATIONS

This is a continuation-in-part of my copending applications Ser. Nos. 483,797, filed Aug. 30, 1965, and 663,558, filed Aug. 28, 1967, both now abandoned.

BACKGROUND OF THE INVENTION

Nitriles have been prepared by ammoxidation of hydrocarbons, especially from the normally gaseous hydrocarbons. However, prior catalysts and procedures for ammoxidizing propylene or isobutylene to acrylonitrile or methacrylonitrile have certain shortcomings. The catalyst either have a very short active life, or they convert only a portion of the hydrocarbon to the desired unsaturated nitrile per pass; they oxidize the hydrocarbon excessively to form high proportions of carbon monoxide or carbon dioxide or both or they are not sufficiently selective, so that the hydrocarbon molecule is attacked at both the olefinic unsaturation and at a methyl group and large amounts of HCN and acetonitrile are formed.

SUMMARY OF THE INVENTION

Acrylonitrile or methacrylonitrile are obtained in good yields by ammoxidation of propylene or isobutylene at an elevated temperature with ammonia and an oxygen containing gas in the presence of catalysts containing (I) a mixture of molybdenum oxide, tellurium oxide and a Group II-A alkaline earth metal phosphate in a molar ratio of 100 molybdenum oxide, 10–100 tellurium oxide, and 10–100 of the II-A alkaline earth metal phosphate, or (II) a mixture of a Group II-A alkaline earth metal molybdate, tellurium oxide and phosphorus oxide in a molar ratio of 100 Group II-A alkaline earth metal molybdate, 10–100 tellurium oxide and 10–100 phosphorus pentoxide. Such catalysts will convert from over 50, to as high as 100%, per pass, of propylene or isobutylene to yield very high proportions of acrylonitrile or methacrylonitrile.

DETAILED DESCRIPTION

The reactants

The essential reactants are propylene or isobutylene, ammonia and an oxygen containing gas, which can be pure oxygen, oxygen enriched air or air without additional oxygen. For reasons of economy, air is the preferred oxygen containing reactant.

The addition of steam into the reactor along with the monoolefin, ammonia and an oxygen containing gas is desirable but not absolutely essential. The function of steam is not clear, but it does seem to reduce the amount of carbon monoxide and dioxide in the effluent gases.

Other diluent gases can be used. Surprisingly, saturated hydrocarbons such as propane or butane are rather inert under the reaction conditions. Nitrogen, argon, krypton or other known inert gases can be used as diluents if desired but are not preferred because of the added cost.

CATALYST PREPARATION

There are several methods for the preparation of the catalysts, which can be supported or unsupported. As to catalyst (I) it is possible to dissolve each of the starting ingredients in water and combine them from the aqueous solutions or the ingredients can be dry blended. Because of the more uniform blend obtained by the solution procedure, it is preferred.

The general procedure for preparing these (I) catalysts from water soluble ingredients is to provide the requisite amount of a molybdenum salt, a tellurium salt and a II-A metal salt in water. Add the requisite amount of phosphoric acid to the metal salt solution. Add the tellurium salt solution to the molybdenum salt solution and then add the metal salt-phosphoric acid mixture to the molybdenum-tellurium salt mixture. The catalyst is then dried and baked at 400° C. for about 16 hours.

Supported catalysts can be prepared by adding an aqueous slurry of the support to the aqueous solution of catalyst or the aqueous catalyst ingredients can be added to the slurry of the support. Alternately a slurry of the catalyst ingredients can be prepared in water, then dried and baked. For supported catalysts the aqueous slurry of the catalyst ingredients can be added to an aqueous suspension of the support or vice versa, and then dried and baked.

A third method is to blend the dry ingredients and then mix them thoroughly. The main difficulty is to obtain thorough blending and uniform particle size.

A specific procedure for making the (I) catalysts is as follows:

In this procedure the ingredients are precipitated on blending.

(a) Dissolve 105.96 g. of ammonium molybdate in 300 ml. of water.

(b) Dissolve 31.922 g. $TeO_2$ in concentrated HCl and filter if necessary.

Add the tellurium salt solution to the ammonium molybdate solution. A precipitate forms.

(c) Dissolve 81.33 g. of $MgCl_2 \cdot 6H_2O$ in water and add 46.2 g. of 85% $H_3PO_4$. Add this mixture slowly to the precipitated ammonium molybdate-$TeO_2$ mixture. Dry the mixture on a steam bath and bake for 16 hours at 400° C. Thereafter the catalyst is ground to the desired mesh size and sieved. For supported catalysts an aqueous slurry of the support can be added to the catalyst ingredients or vice versa prior to drying and baking.

Among the suitable supports are silica, silica containing materials such as diatomaceous earth and kieselguhr, silicon carbide, clay, aluminum oxides and even carbon, although the latter tends to be consumed during the reaction.

If the catalyst is to be supported the aqueous solution of ingredients can be added to an aqueous slurry of the support or vice versa, prior to drying. The procedure after drying is the same as that already described. Thus, to the aqueous catalyst ingredients 240 g. (1.2 mols) of a 30–35% colloidal dispersion of microspheroidal silica (Ludox H.S.) are added slowly with stirring. Stirring is continued for about ½ hour prior to drying. Another procedure is to add the mixture described under (c)

to the Ludox and then add the requisite amount of $TeO_2$ and $MoO_3$ as a slurry. Also, the ingredients can be added to the Ludox individually if desired.

Another method is to grind $MoO_3$, $TeO_2$ and a magnesium pyrophosphate to the proper particle size and then thoroughly mix the dry powders. The mixture can be added to an aqueous slurry of a support or vice versa and thereafter dried and baked.

For fixed bed systems a 10–18 mesh (U.S. Sieve) size is satisfactory. For fluid bed systems the catalyst particle size should be 80–325 mesh (U.S. Sieve).

The catalysts contain chemically bound oxygen so that a generic formula can be written as

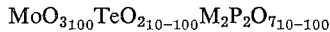

wherein M is the alkaline earth metal.

The phosphate can be a $PO_4$ radical, pyrophosphate or a polyphosphate, for example, calcium diphosphate, calcium hypophosphate, calcium methaphosphate, calcium monophosphate, calcium pyrophosphate, calcium triphosphate, strontium pyrophosphate, magnesium phosphate, magnesium acid phosphate, magnesium pyrophosphate, barium pyrophosphate, beryllium phosphate and the like.

A useful catalyst is one having a molar ratio of about $75MoO_3$, $25TeO_2$ and $25II-A$ metal $P_2O_7$ because it gives a high yield of desired products and the preferred support is silica, because of its low cost and good fluidizing characteristics. This catalyst has the empirical formula $Mo_{10}Te_{3.33}IIAM_{6.66}P_{6.66}O_{60}$.

The (II) catalyst, containing the Group II–A alkaline earth metal molybdate, strontium molybdate for example, tellurium oxide and phosphorus pentoxide may be prepared by a number of methods and may be supported or unsupported. The catalyst ingredients may be mixed in the form of solutions or slurries, or can be dry blended.

A general procedure for preparing the catalyst is to make a slurry of the II–A metal molybdate, add a slurry of ammonium tellurate thereto, and then add phosphoric acid. The resulting mixture is evaporated to dryness on a steam bath, calcined in a hot tube oven for 16 hours at 400 to 425° C., cooled to room temperature and meshed to the desired size.

Supported catalysts may be prepared by adding a dry support or aqueous slurry thereof to the catalyst ingredients. Alternatively, powdered molybdate and ammonium tellurate may be mixed with phosphoric acid, a dry support added thereto and dried.

Among suitable supports are silica, silica-containing materials such as diatomaceous earth, kieselguhr, silicon carbide, clay, aluminum oxides and the like. Catalysts with molar ratios of 100 II–A metal molybdate, 10–100 tellurium oxide and 10–100 phosphorus pentoxide are useful in oxidizing propylene or isobutylene to acrylonitrile or methacrylonitrile in excellent yields. Better results have been obtained with $SrMoO_4$ and $BaMoO_4$.

REACTION CONDITIONS

The reaction can be carried out in either a fixed or fluidized catalyst bed.

The reaction temperature can range from about 350 to 500° C. but the preferred range is from about 375 to about 480° C. Below about 375° C. the conversion of monoolefin per pass and yield of unsaturated nitrile is lower than desirable. Usually, a longer contact time is needed at lower temperatures to obtain the yields of unsaturated nitriles obtainable at temperatures in the optimum range. Above 480° C. some of the acrylonitrile appears to be oxidized to carbon oxides, acetonitrile and HCN. This is much more apparent above 500° C.

The mol ratio of oxygen to propylene should be from 1.5 to 1 and preferably from 2 to 1 to 4 to 1 for good conversion and yields, but ratios with some excess oxygen, 33 to 100% is even more desirable and is preferred. There is no critical upper limits as to the amount of oxygen, but when air is used as the oxygen containing gas it becomes apparent that too great an excess will require large reactors, pumping, compressing and other auxiliary equipment for any given amount of desired end product. It is therefore best to limit the amount of air to povide 33 to 66% excess of oxygen. This range provides the largest proportion of nitrile under given reaction conditions. Also, since care is needed to avoid an explosive mixture the limiting of air aids in that direction.

The mol ratio of ammonia to propylene can range from about 0.5 to 1 to about 1.75 to 1. A preferred ratio is 0.75 to 1.5 of ammonia per mol of propylene.

The molar ratio of steam to propylene can range from 0 to about 10, but best results are obtained with molar ratios of about 3 to 5 per mol of propylene and for this reason are preferred.

The cold contact time can vary considerably in the range of about 1 to 70 seconds, calculated at room temperature and pressure, 25° C. and 760 mm. Good results are obtained in a range of about 8 to 54 seconds and this range is preferred.

The reaction can be run at atmospheric pressure, in a partial vacuum or under induced pressure up to 50–100 p.s.i. Atmospheric pressure is preferred for fixed bed systems and a pressure of 1 to 50 p.s.i. for fluid bed reactions. Care is needed to operate at a pressure preferably which is below the dew point pressure of the acrylonitrile or methacrylonitrile at the reaction temperatue.

The examples are intended to illustrate the invention but not to limit it.

EXAMPLE 1

The catalyst in this example was prepared by the solution procedure described above. It contained a molar ratio of 75 $MoO_3$, $25TeO_2$ and $25Mg_2P_2O_7$ and was unsupported. A high silica glass (Vycor) tube 12 inches long and 30 mm. in outer diameter was filled with 170 ml. of the catalyst. Three external electrically operated heating coils were found on the reactor. One of the coils extended along the entire length of the reactor and each of the remaining coils extended about one half the length of the reactor. Outlet vapors were passed through a short water cooled condenser. Uncondensed gases were passed through a gas chromatograph (Perkin-Elmer Model 154D) and analyzed continuously. The liquid condenser was weighed and then analyzed for its acrylonitrile content in the gas chromatograph.

Steam at a temperature of 200–250° C. was first passed into this fixed bed reactor. Then propylene and air were fed separately into the stream of water vapor. The mixture passed through a pre-heater and entered the reactor at a temperature of 200–250° C. The reactor was preheated to about 300° C. before the gas feed was begun. The molar ratio of the feed was 3 mols of oxygen (supplied as air) per mol of propylene, 4.36 mols of water per mol of propylene and 0.86 mol of ammonia per mol of propylene. The temperature in the reactor was raised to about 415° C. and held at this temperature during the run. The cold contact time was 48 seconds. All of the propylene was consumed in the reactor to produce a mol percent yield of 47.72 of acrylonitrile and 14.9 acrylic acid based on the propylene converted. No acetonitrile could be detected in the effluent gases. At 400° C. about 40% acrylonitrile and 23% acrylic acid were obtained. When this example was repeated with a strontium pyrophosphate catalyst, even higher yields were obtained.

EXAMPLE 2

A silica supported catalyst was prepared as described above having a molar ratio of catalyst ingredients of $75MoO_3$, $25TeO_2$ and $25Sr_2P_2O_7$. A fluidized bed reactor was utilized and the reaction conditions employed were: a ratio of 3 mols of oxygen (air), 1.07 mols of ammonia and 3.88 moles of steam per mol of propylene, a temperature of 400° C. and a contact time of 38 seconds (25° C. and 760 mm.). 94.21% of the propylene was converted, the mol percent yield of acrylonitrile was 67.43% for an efficiency of 63.53%.

EXAMPLE 3

An unsupported catalyst containing, on a molar basis, 75MoO$_3$, 25TeO$_2$ and 25Ba$_2$P$_2$O$_7$ was tested in the fixed bed reactor of Example 1. The molar ratio of reactants was 3 of oxygen (in air), 4.06 of steam and 1.07 of ammonia. The reaction was conducted at 430° C. at a contact time of 38 seconds. The mol percent conversion of propylene was 97.48 and the mol percent yield of acrylonitrile was 66.93%.

Specific catalyst compositions of catalyst (II) used in the examples following were prepared by mixing one mol of the II–A metal molybdate in a water slurry with 89.2 grams of ammonium tellurate in a water slurry, and then 115.3 grams of 85% H$_3$PO$_4$4. The resulting mixture was evaporated to dryness on a steam bath and calcined in a hot tube oven overnight at 400 to 425° C. The catalyst was ground to a mesh size of 10 to 18 mesh (U.S. Sieve). This catalyst contains a molar ratio of 100 II–A molybdate 33 tellurium oxide and 50 phosphorus pentoxide.

As an example of demonstrating preparation of a supported catalyst containing the II–A metal molybdate, the ammonia tellurate and phosphoric acid, there is added to the aqueous dispersion described above 315 grams of a 30–35% colloidal dispersion of microspheroidal silica (Ludox H.S.) slowly with stirring. After thorough mixing, the catalyst is dried as described above. Another procedure is to add the mixture of ingredients ot the Ludox, or the ingredients may be added to the Ludox individually.

EXAMPLE 4

The catalyst of this example was prepared in accordance with the dispersion procedure described above. It contained a molar ratio of 100 barium molybdate, 33 tellurium oxide and 50 phosphorus pentoxide. A high silica glass (Vycor) tube 12″ long and 30 mm. outer diameter was filled with 170 ml. of the 10–18 mesh catalyst. External electrically operated heating coils were wound on the reactor. The outlet vapors were passed through a water-cooled condenser. Uncondensed gases were passed through a gas chromatograph. The liquid was weighed and analyzed for acrylonitrile in the gas chromatograph. The reactor was preheated to about 300° C. before feeding the olefin into the reactor. Steam at a temperature of about 250° C. was first passed into the fixed bed reactor. Propylene, air and ammonia were fed separately into the stream of water vapor which passed through a preheater and entered the reactor at about 200 to 250° C. The ratio of reactants other than ammonia, which is set forth in the data table, was 3 mols of oxygen and 4.06 mols of water per mol of propylene. The contact time calculated at room temperature and pressure was 43 seconds. The reaction temperature and yields of acrylonitrile are set forth in Table 1 below.

TABLE 1

| Temperature, ° C. | NH$_3$, Mols | Conversion, Percent | Acrylonitrile, Percent |
|---|---|---|---|
| 425 | 1.07 | 94.78 | 65.77 |
| 430 | 1.28 | 93.36 | 73.52 |
| 390 | 1.07 | 54.05 | 72.12 |
| 425 | 1.07 | 86.11 | 62.01 |

EXAMPLE 5

Another catalyst was prepared according to the general procedure set forth above and contained in molar ratio, 100 strontium molybdate, 33 tellurium oxide and 50 phosphorus pentoxide. 4.06 mols of steam per mol of propylene and 1.07 mols of ammonia per mol of propylene were employed. The reaction temperature, contact times, mols of oxygen per mol of propylene, conversions and percent yields of acrylonitrile are set forth in Table 2.

TABLE 2

| Temperature, ° C. | Contact Time, Seconds | Oxygen, Mols | Conversion, Percent | Acrylonitrile, Percent |
|---|---|---|---|---|
| 405 | 43 | 3.00 | 92.73 | 54.02 |
| 385 | 43 | 3.00 | 95.03 | 68.80 |
| 385 | 43 | 3.00 | 97.09 | 62.83 |
| 395 | 35 | 4.03 | 96.91 | 65.57 |

While the best yields of acrylonitrile were obtained with barium molybdate and strontium molybdate, very good yields were also obtained with calcium molybdate and magnesium molybdate.

EXAMPLE 6

A catalyst was prepared as described containing in molar ratio 100 calcium molybdate, 33 tellurium oxide and 50 phosphorus pentoxide. Reaction conditions, amounts of reactants per mol of propylene, conversion and yields are set forth in Table 3.

TABLE 3

| Temp., ° C. | Contact Time, Seconds | Oxygen, Mols | Steam, Mols | Ammonia, Mols | Conversion, Percent | Acrylic Acid, Percent | Acrylonitrile, Percent |
|---|---|---|---|---|---|---|---|
| 365 | 43 | 3.00 | 4.06 | 1.07 | 52.65 | -------- | 58.02 |
| 395 | 43 | 3.00 | 4.06 | 1.07 | 92.20 | 6.65 | 48.21 |
| 405 | 35 | 4.03 | 4.06 | 1.07 | 27.60 | 11.18 | 47.95 |
| 410 | 31 | 3.00 | 3.88 | 0.90 | 96.20 | 11.88 | 48.17 |
| 415 | 31 | 3.00 | 3.88 | 1.05 | 97.86 | 3.29 | 45.48 |

EXAMPLE 7

In this series of runs the catalyst prepared as described above contained, in molar ratio, 100 magnesium molybdate, 33 tellurium oxide and 50 phosphorus pentoxide. The reaction conditions, molar ratios of reactants per mol of propylene, conversion and yield are set forth in Table 4.

TABLE 4

| Temp., ° C. | Contact Time, Seconds | Oxygen, Mols | Steam, Mols | Ammonia, Mols | Conversion, percent | Acrolein, percent | Acrylonitrile, percent |
|---|---|---|---|---|---|---|---|
| 435 | 28 | 3.04 | 4.2 | 1.14 | 74.25 | 36.55 | 49.56 |
| 435 | 22 | 3.00 | 4.06 | 1.07 | 68.35 | 43.90 | 45.30 |
| 440 | 22 | 3.00 | 4.06 | 1.07 | 76.13 | 41.84 | 42.21 |
| 435 | 22 | 3.00 | 4.06 | 1.29 | 76.53 | 35.84 | 53.31 |

In the case of calcium molybdate some acrylic acid was also produced and in the case of magnesium molybdate substantial amounts of acrolein were produced in addition to excellent yields of acrylonitrile.

The hydrocarbons which are ammoxidized according to this invention have the formula

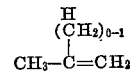

The desired end products result from the ammoxidation of only one methyl group on the hydrocarbon molecule, while the terminal $CH_2=C<$ group remains intact.

The nitriles produced can be defined as alpha, beta monoolefinically unsaturated nitriles having 3 to 4 carbon atoms and a terminal $CH_2=C<$ group or they can be defined by the general formula

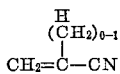

I claim:

1. A method for ammoxidizing olefins to form unsaturated nitriles which comprises passing propylene or isobutylene, a molecular oxygen-containing gas in a quantity sufficient to provide a molar ratio of from about 1.5 to 4 mols of oxygen per mol of olefin, ammonia in a molar ratio of from about 0.5 to 1.75 mols of ammonia per mol of olefin, over a catalyst (I) consisting essentially of molybdenum oxide, tellurium oxide and a Group II–A metal phosphate in a molar ratio of 100 molybdenum oxide, 10–100 tellurium oxide and 10–100 of Group II–A metal phosphate, or (II) consisting essentially of a Group II–A alkaline earth metal molybdate, tellurium oxide and phosphorus pentoxide in a molar ratio of 100 II–A metal molybdate, 10–100 tellurium oxide and 10–100 phosphorus pentoxide, at a temperature of about 350 to 500° C. and a contact time of about 1 to 70 seconds.

2. The method of claim 1 wherein the hydrocarbon is propylene, oxygen is present in amount from about 2 to 4 mols per mol of propylene, ammonia from about 1 to about 1.5 mols per mole of propylene, and there is present from 0 to about 10 mols of water vapor per mol of propylene, the reaction temperature is from about 375 to 415° C. and the contact time is about 8 to 54 seconds.

3. The method of claim 2 wherein the II–A metal phosphate is magnesium pyrophosphate.

4. The method of claim 2 wherein the II–A metal phosphate is strontium pyrophosphate.

5. The method of claim 2 wherein the II–A metal phosphate is barium pyrophosphate.

6. The method of claim 2 wherein the II–A metal molybdate is strontium molybdate.

7. The method of claim 2 wherein the II–A metal molybdate is barium molybdate.

8. The method of claim 2 wherein the II–A metal molybdate is calcium molybdate.

9. The method of claim 2 wherein the II–A metal molybdate is magnesium molybdate.

10. The method of claim 1 in which the hydrocarbon is isobutylene, oxygen is present in amount from about 2 to 4 mols per mol of propylene, ammonia from about 1 to about 1.5 mols per mol of propylene, and there is present from 0 to about 10 mols of water vapor per mol of propylene, the reaction temperature is from about 375 to 475° C. and the contact time is about 8 to 54 seconds.

11. The method of claim 10 wherein the II–A metal molybdate is strontium molybdate.

12. The method of claim 10 wherein the II–A metal molybdate is barium molybdate.

13. The method of claim 10 wherein the II–A metal molybdate is magnesium molybdate.

14. The method of claim 10 wherein the II–A metal molybdate is calcium molybdate.

15. The method of claim 10 wherein the II–A metal phosphate is strontium pyrophosphate.

16. The method of claim 10 wherein the II–A metal phosphate is barium pyrophosphate.

17. The method of claim 10 wherein the II–A metal phosphate is magnesium pyrophosphate.

No references cited.

JOSEPH P. BRUST, *Primary Examiner.*

U.S. Cl. X.R.

252—434, 437; 260—533, 604